United States Patent [19]
Poling

[11] Patent Number: 5,798,925
[45] Date of Patent: Aug. 25, 1998

[54] METHOD AND APPARATUS FOR MONITORING A MOVING STRIP

[75] Inventor: Alan D. Poling, Bay Village, Ohio

[73] Assignee: L-S Electro-Galvanizing Company, Cleveland, Ohio

[21] Appl. No.: 909,029

[22] Filed: Aug. 11, 1997

Related U.S. Application Data

[63] Continuation of Ser. No. 442,499, May 16, 1995, abandoned.

[51] Int. Cl.$^6$ .................................................. G06F 11/00
[52] U.S. Cl. .............................. 364/469.02; 364/469.01; 364/472.06
[58] Field of Search .................... 364/469.01, 469.02, 364/470.14, 474.05, 474.09, 472.04, 472.06, 472.12; 356/376; 318/570

[56] References Cited

U.S. PATENT DOCUMENTS

| | | |
|---|---|---|
| 3,633,010 | 1/1972 | Svetlichny. |
| 3,840,302 | 10/1974 | Brunton et al.. |
| 3,917,414 | 11/1975 | Geis et al.. |
| 4,088,408 | 5/1978 | Burcher et al.. |
| 4,131,803 | 12/1978 | Takematsu et al.. |
| 4,327,615 | 5/1982 | Gerber et al. ............... 364/414.01 |
| 4,541,723 | 9/1985 | Pirlet. |
| 4,633,420 | 12/1986 | Masanobu. |
| 4,677,578 | 6/1987 | Wright et al. ..................... 364/562 |
| 4,752,695 | 6/1988 | Pirlet ................................. 250/560 |
| 4,920,385 | 4/1990 | Clarke et al. ....................... 356/237 |
| 4,928,257 | 5/1990 | Yerkes et al. ...................... 364/563 |
| 4,958,307 | 9/1990 | Mishimura .................... 364/551.01 |
| 4,989,984 | 2/1991 | Salinger ............................. 356/445 |
| 5,004,928 | 4/1991 | Suzuki et al. ..................... 250/559 |
| 5,068,799 | 11/1991 | Jarret, Jr. .......................... 364/507 |
| 5,083,867 | 1/1992 | Burk ................................. 356/376 |
| 5,089,971 | 2/1992 | Gerber ........................... 364/470.14 |
| 5,127,726 | 7/1992 | Moran ............................... 356/237 |
| 5,317,387 | 5/1994 | Van Hengel et al. ............. 356/372 |
| 5,325,443 | 6/1994 | Beatty et al. .......................... 382/8 |
| 5,351,203 | 9/1994 | Hoffman et al. .................. 364/560 |

FOREIGN PATENT DOCUMENTS

| | | |
|---|---|---|
| 47-1430 | 1/1971 | Japan. |
| 46-21515 | 6/1971 | Japan. |
| 57-163808 | 10/1982 | Japan. |
| 57-179609 | 11/1982 | Japan. |
| 57-179610 | 11/1982 | Japan. |
| 57-179611 | 11/1982 | Japan. |
| 62-55502 | 3/1987 | Japan. |
| 62-64903 | 3/1987 | Japan. |
| 62-88909 | 4/1987 | Japan. |
| 63-252209 | 10/1988 | Japan. |
| 1209307 | 8/1989 | Japan. |
| 2311705 | 12/1990 | Japan. |
| 3140810 | 6/1991 | Japan. |
| 3218404 | 9/1991 | Japan. |
| 2077912 | 12/1981 | United Kingdom. |
| 91/13342 | 9/1991 | WIPO. |

*Primary Examiner*—Paul P. Gordon
*Attorney, Agent, or Firm*—Watts, Hoffmann, Fisher & Heinke, Co., L.P.A.

[57] ABSTRACT

A monitoring system for determining a cross-sectional shape or profile of a steel strip. The monitoring system includes a scan unit that traverses back and forth across the width of the strip as the strip moves through a plating line. The scan unit includes a radiation source for directing a radiation beam toward a surface of the strip and a photodetector for monitoring radiation reflected from the surface of the strip. Using optical triangulation, the distance to the surface of the strip is obtained and collected by a computer. The computer co-ordinates the scan data with the position of the scan unit relative to the strip and displays data corresponding to the cross-sectional shape of the strip.

14 Claims, 5 Drawing Sheets

METHOD AND APPARATUS FOR MONITORING A MOVING STRIP

This patent application is a continuation of U.S. patent application Ser. No. 08/442,499, filed May 16, 1995, now abandoned.

TECHNICAL FIELD

The present invention relates to a method and apparatus for monitoring the profile of a moving web or strip. More specifically the present invention relates to the monitoring of the shape of a steel strip to control a process in which a coating is applied to the steel strip.

BACKGROUND ART

Coating a sheet of steel by electro-galvanizing one or both sides of a steel strip after the strip has been rolled to a desired thickness makes the sheet more resistant to corrosion. As an illustrative example, a uniform coating of zinc can be plated onto one or both sides of the steel strip that is used to fabricate a motor vehicle body panel. The finished motor vehicle body panel is more corrosion resistant than a body panel made from steel sheet that has not had a sacrificial coating such as zinc applied to it to prolong the useful life of the car body.

Coating of steel strip is typically performed on a coating line where uncoated strip is unwound from a roll and processed through a series of treatments including cleaning, flattening and electro-galvanizing. In the electro-galvanizing step the strip is moved through a coating bath where the strip acts as a cathode for a coating process. By controlling the concentration of chemicals added to the bath and the application of energizing voltages to anode electrodes suspended within the bath, the electro-galvanizing process can be controlled to achieve a specified coating thickness.

The cross-sectional shape or profile of the steel strip, however, affects the coating weight distribution over the steel strip as the amount of coating applied to the steel strip can vary depending upon the distance of the strip from the anode electrodes. Because end users of coated steel usually specify a desired minimum coating thickness, steel strip having less than a specified minimum coating thickness is typically unsatisfactory and scrapped. The plating bath may be controlled to increase the coating thickness over the strip to help account for deviations in the flatness of the strip and thus ensure a desired minimum coating thickness is plated over all portions of the strip. This solution, however, may prove wasteful as various portions of the strip are then plated with unnecessarily thick coatings.

DISCLOSURE OF THE INVENTION

Apparatus constructed in accordance with one embodiment of the present invention monitors a shape of a web or strip as that strip is moved along a travel path. A source directs a radiation beam into contact with a surface of the strip and a photodetector monitors radiation that reflects from the surface of the strip.

A drive system supports the source and photodetector for synchronized movement back and forth across a width of the strip as the source directs radiation toward the strip and the photodetector monitors return radiation. The return radiation information is stored in a memory with corresponding co-ordinate locations at which the radiation from the source strikes the surface of the strip. A display operatively coupled to the memory provides an indication of the shape of the strip.

A preferred radiation source is a laser that provides a concentrated beam directed toward a surface of the strip. A presently preferred application for the invention is a system for monitoring steel strip before the strip enters a plating bath.

The preferred detector is a position sensitive photodetector that converts radiation reflected from the strip into an electrical signal proportional to the distance to the surface of the strip. The laser and photodetector are mounted to a support that is driven back and forth by a motor. The support is coupled by a linear bearing to a crosspiece that extends over the steel strip.

Signals from the photodetector are monitored and stored in digital form in a memory. Each scan of the strip results in an array of data points corresponding to the co-ordinates of a surface of the steel facing the laser. Upon each traversal of the strip width, a display is updated with a new representation of the strip profile.

In accordance with a preferred embodiment of the invention, a plating line operator monitors the display and takes steps to adjust the shape of the steel strip if the shape deviates from a desired shape. The monitoring apparatus may also automatically adjust the shape of the steel strip based on the monitored strip profile.

In the preferred application of the invention a steel strip extends many hundreds of feet from the point it is unreeled from a coil to the point the coated strip is again rolled back onto a mandrel. The distance between a point just prior to the plating bath to a control room where operators monitor the plating line may also be hundreds of feet. In accordance with the invention multiple computer stations are connected together by a computer network. The bandwidth of the computer network is high enough that strip profile data gathered by one computer can be displayed not only at the site where it is gathered but can also be displayed on other computers or terminals on the network with relatively minimized delay in presentation.

These and other objects, advantages and features of the invention will be better understood from the following detailed description of a preferred embodiment of the invention when reviewed in conjunction with the accompanying drawings.

BEST MODE FOR PRACTICING THE INVENTION

Figure 1:
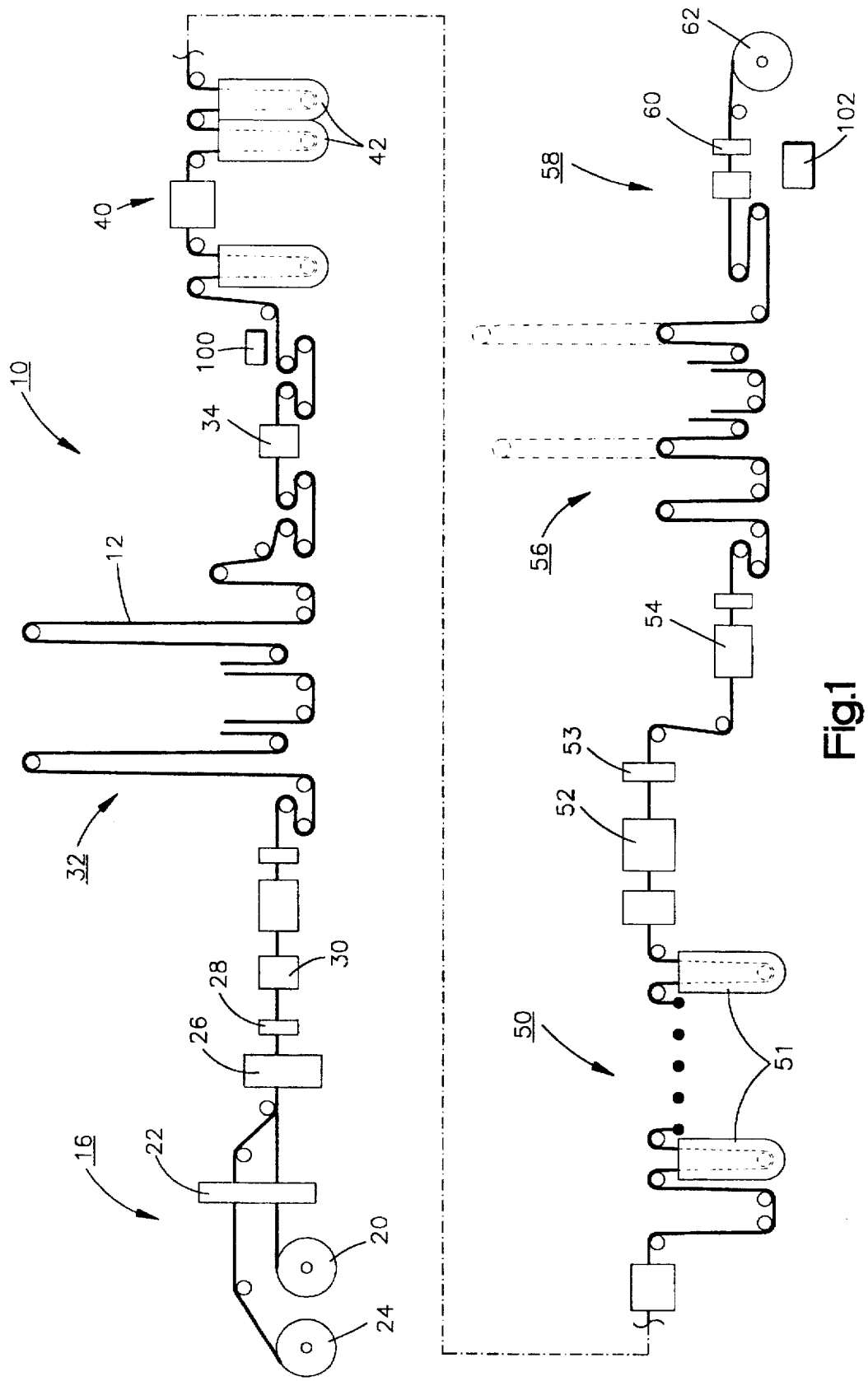
FIG. 1 illustrates a schematic of a steel strip plating line for applying a coating to an elongated steel strip.

FIG. 1 illustrates a schematic overview of a plating line 10 for plating a strip of steel 12. Such a strip ranges from 24 to 73 inches in width, ranges from 0.015 inches to 0.065 inches in thickness, extends for thousands of feet in length, and can weigh up to 60,000 pounds. A coil of uncoated steel is mounted to a payoff reel at an entry station 16 and an outer end of the steel is unwound and routed along a plating travel path. The steel strip is cold rolled steel that has been fabricated to a desired strip thickness and treated with a lubricating oil that inhibits rusting of the uncoated steel.

Strip Plating System

At the entry station 16 the beginning end of a steel strip is automatically fed from one payoff reel 20 and cut by a double cut shear 22 as strip is being unwound from a second payoff reel 24 and plated. After the strip being fed from the reel 24 is depleted, the end of the strip is automatically welded to the front of the next coil supported by the payoff reel 20 by a welder 26.

After welding, both edges of the weld may be notched by a notcher 28, for example at a width change in the strip. The notcher 28 assures the integrity of the weld. The strip 12 then enters a precleaner 30 having high pressure hot water sprays that remove the lubricating oil before the strip 12 is coated with zinc.

After the strip 12 is rinsed and dried, the strip 12 enters a first vertical accumulator 32 which provides approximately 1800 feet of strip storage. This storage allows the strip 12 to stop for approximately 2.5 minutes without affecting the plating of strip downstream from the accumulator 32. As the two ends of strip are welded by welder 26, the 1800 feet of strip from the previous roll stored in the accumulator 32 is fed from the accumulator 32 and plated while the ends of the two strips that are to be welded together remain stationary.

In a process section of the plating line 10, the strip 12 is flattened by a tension leveler 34, thoroughly cleaned with caustic solution and acid solution, and then plated with zinc on one or both sides. Before the strip 12 is plated, the tension leveler 34 flattens the steel strip 12. A flat strip assures more uniform plating distribution across the width and avoids wasteful excess plating. The present invention is particularly concerned with assuring strip flatness through monitoring of strip shape downstream from the tension leveler 34.

When the strip 12 leaves the tension leveler 34, the strip 12 is cleaned again at a cleaning station 40. The cleaning station 40 includes a series of vertical pass caustic, electrolytic caustic, hot water, and pickling tanks 42 with brush scrubbers. The purpose of the additional cleaning is to provide a microscopically clean surface in order to assure good plating adhesion. The cleaning station 40 removes loose iron filings and smut which may be present on the surface of the steel strip 12.

After passing through the cleaning station 40, the strip 12 enters a plating section 50. The plating section 50 has twenty vertical plating cells 51 with each cell 51 providing up to 66,000 amps of plating current. A plating cell 51 includes a conductor roll, a conductor roll grindstone, four insoluble anodes, four edge masks, counter-flow electrolyte injection headers, a sink roll, and wringer rolls.

The strip 12 next passes through a post plating section 52 where the strip 12 is scrubbed to remove residual electrolyte from the surface of the strip 12 and then rinsed. The plating process is also continuously monitored by a profiling coating weight gauge 53. A surface polisher 54 removes oxides that have formed on the unplated strip surface of one side plated strip. This polishing allows for proper paintability of the finished steel. The strip 12 next passes through a second vertical accumulator 56 which also provides approximately 1800 feet of strip storage. The second accumulator 56 allows the strip 12 to stop for approximately 2.5 minutes as the strip 12 is processed at an exit station 58.

At the exit station 58, the coated strip 12 is inspected and coated with an oil layer to prevent oxidation prior to use by the end user. A shear 60 cuts the plated strip 12 into separate strips for packaging. At the vicinity of the shear 60, welds are also removed and sample pieces of steel are cut from the strip 12. A tension reel 62 rewinds the plated steel strip. Each rewound coil of plated steel is banded and moved to a packaging area where it is packaged for shipment.

Strip Shape Inspection Station

Figure 2:
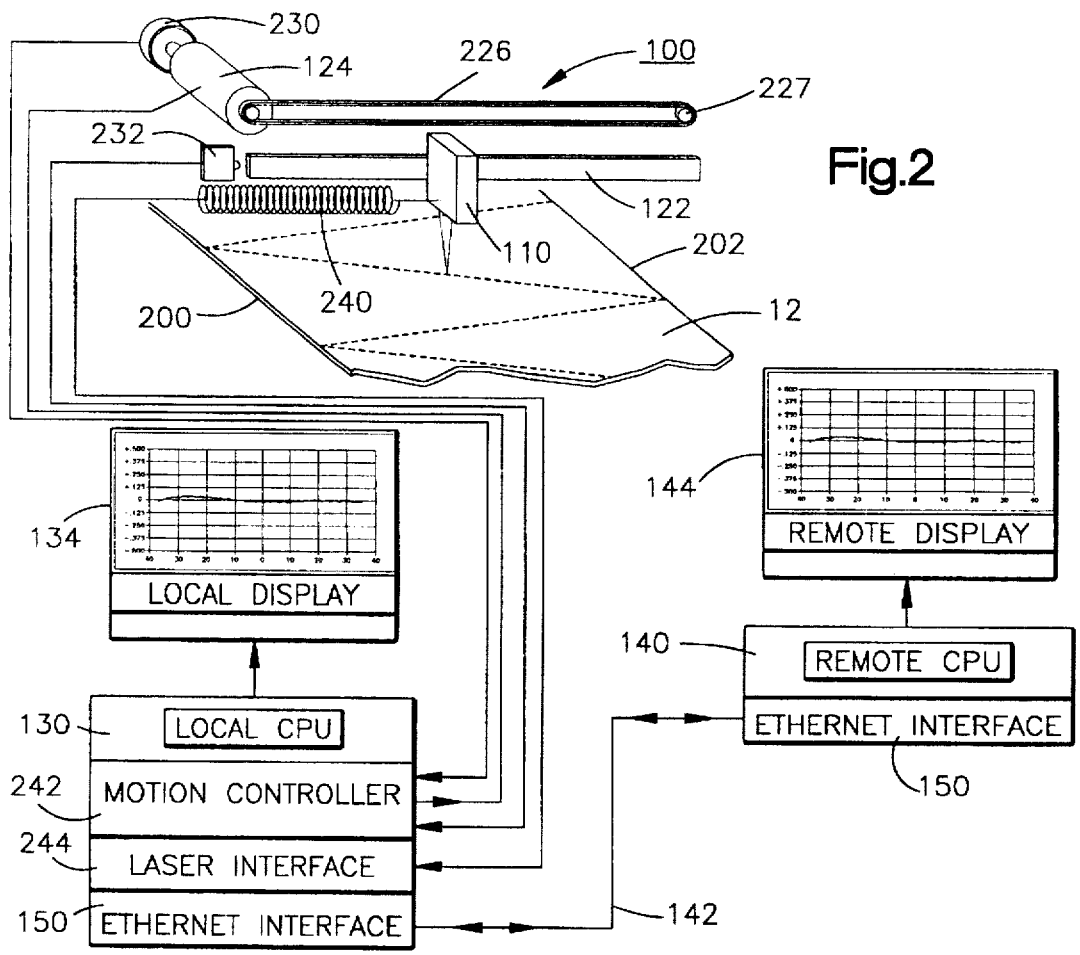
FIG. 2 illustrates a schematic of a strip shape monitoring station constructed in accordance with the invention.
Figure 3:
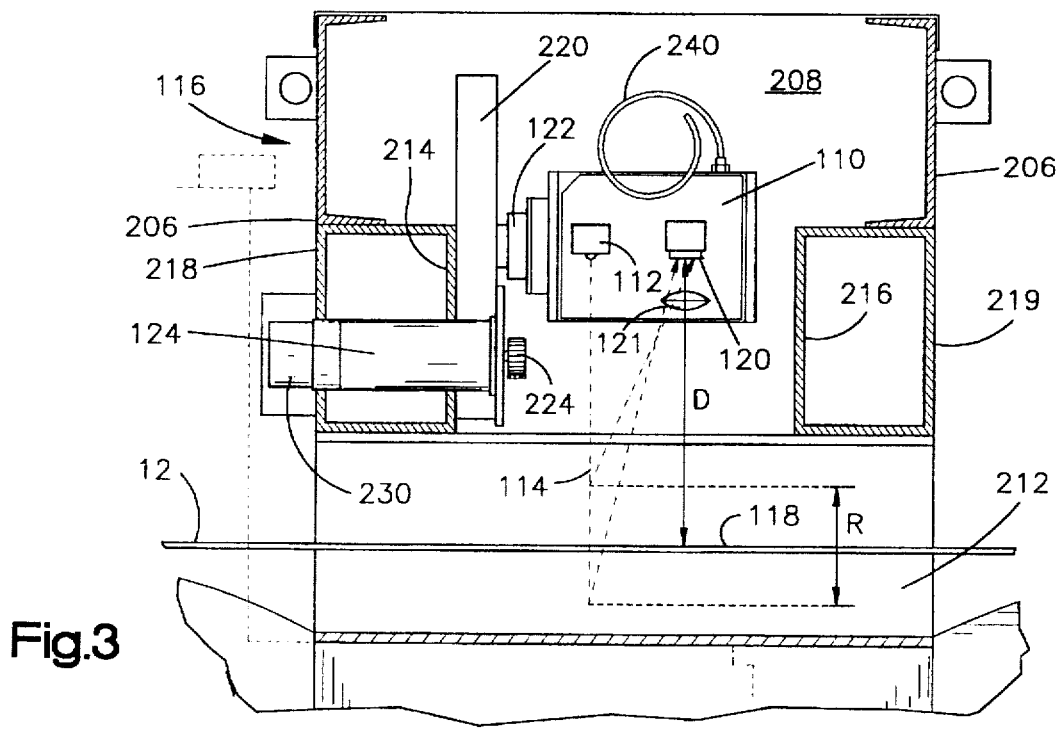
FIG. 3 illustrates a partially sectioned elevation view of structure for mounting a laser for back and forth scanning movement over a strip.
Figure 4:
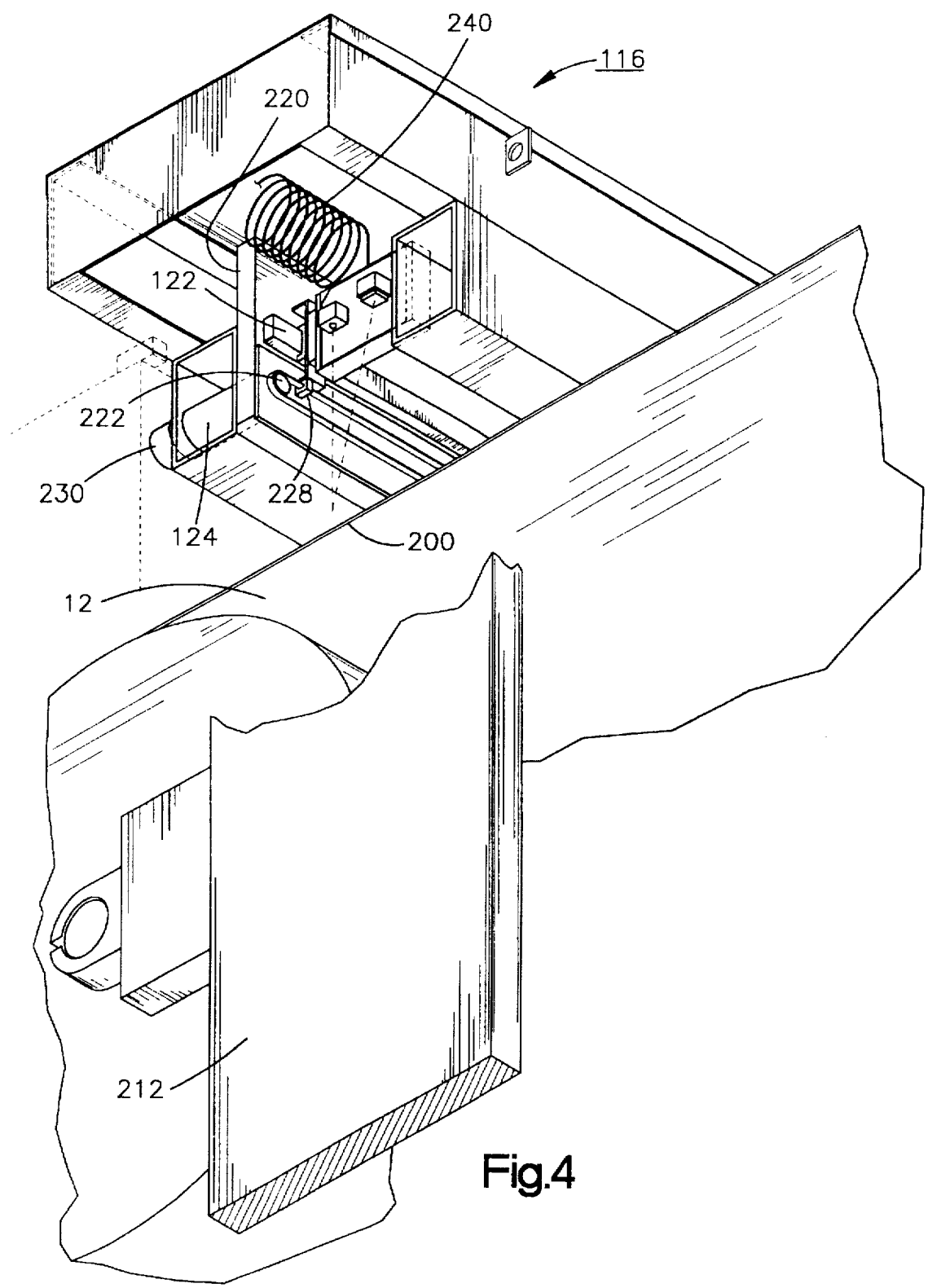
FIG. 4 illustrates a perspective view of structure for scanning a laser beam emitting unit back and forth across steel strip as reflected radiation from the strip is monitored by a photodetector.

A strip shape inspection station 100 is illustrated in FIGS. 2, 3, and 4. The inspection station 100 is located downstream from the tension leveler 34 and before the cleaning station 40, for example at the region illustrated in FIG. 1. At the inspection station 100 a visual depiction of the strip 12 is presented for viewing by a strip plating operator or operators. Depending upon the sensed profile or shape of the strip 12, steps may be taken to adjust the operation of the leveler 34 (FIG. 1) to provide a relatively more uniform strip profile and therefore a relatively more uniform plating of the strip 12.

The inspection station 100 includes apparatus for monitoring a shape of the moving strip 12 as the strip 12 moves along its path of travel between the leveler 34 and the cleaning station 40. A scan unit 110 is mounted to a scan unit support frame 116 (FIGS. 3 and 4) that spans the width of the strip 12. The scan unit 110 includes a radiation source 112 (FIG. 3) such as a laser for directing a radiation beam 114 into contact with one surface 118 of the elongated strip 12. A photodetector 120 also forms part of the scan unit 110 and moves with the source 112 to monitor radiation that reflects from the surface 118 of the elongated strip 12.

A preferred scan unit 110 is constructed using a Selcom SLS 5070/200 laser sensor configured with a standoff distance of approximately 200 millimeters, a measuring range R of approximately 70 millimeters, an infrared laser spot measuring area on the strip 12 of approximately 0.4 millimeters in diameter, and an analog output of approximately 0–20 milliamperes. This Selcom laser sensor uses receiver optics 121 to direct reflected radiation to a position sensitive photodetector 120. Based on the location or position the reflected radiation is detected on the position sensitive photodetector 120, the Selcom laser sensor generates an electrical signal having a current proportional to the distance to the surface of the strip 12. This Selcom laser sensor can perform these optical laser triangulation measurements at a rate of approximately 16,000 times per second with a resolution of approximately 0.025 percent.

The scan unit 110 is mounted to an elongated linear bearing 122 that supports the source 112 and photodetector 120 for back and forth movement along a linear travel path that spans a width of the strip 12 as the source 112 directs radiation 114 toward the strip 12 and the photodetector 120 monitors return radiation. A scanning servo motor 124 moves the scan unit 110 back and forth across the width of the strip 12.

Scanning movement and monitoring of data picked up by the photodetector 120 is performed by a first computer 130. The computer 130 has a memory that stores a plurality of data values corresponding to co-ordinate locations at which the radiation 114 from the source 112 strikes the surface 118 of the strip 12 as indicated by reflected radiation sensed by the photodetector 120. The computer 130 is coupled to a display 134 and a printer (not shown) that provide an indication of the shape of the strip 12.

The steel strip 12 extends many hundreds of feet from the inspection station 100 to the exit station 58 where the strip 12 is wound back onto the tension reel 62. The distance between a point just prior to the plating section 50 to a control room 102 where operators monitor the performance of the entire plating line 10 may also be hundreds of feet. As illustrated in FIG. 2, a second computer 140 is connected to the first computer 130 by a computer network 142 such as an ethernet network. The bandwidth of the computer network 142 is high enough that data gathered by the first computer 130 can be displayed on the display 134 and can also be displayed on a display 144 coupled to the second computer 140 in the control room 102 or on other computer terminals on the network 142 with relatively minimized presentation delay.

Preferred computers 130, 140 are IBM compatible microcomputers incorporating Intel 80486 66 Mhz microprocessors and include industry standard (ISA) expansion busses that allow interface cards to be inserted into the microcomputer housings. Each of the computers 130, 140 include an ethernet communications board 150 that interfaces with the network 142 by industry standard cable connectors. A preferred ethernet communications board 150 is an Ether Express 16 ethernet adapter, part number PCLA8110, available from Intel.

When the computers 130, 140 are powered up, each computer 130, 140 executes a network program, such as Novell Netware for example, in the background. As the first computer 130 at the inspection station 100 monitors the strip shape, the first computer 130 stores data values representing the strip shape into a RAM virtual disk that occupies a region of the computer's memory. Once data corresponding to the strip shape has been updated, the computer 130 sets a signalling bit in its memory which the second remote computer 140 is programmed to periodically read. When the remote computer 140 senses the data has been updated, it reads this data from the computer memory and causes the update data bit to be cleared so the computer 130 knows the data has been read. The second computer 140 is able to display a strip profile on its display 144 within a fraction of a second after the first computer 130 displays the profile on its display 134.

Scan Unit Support and Movement

The linear bearing 122 extends across the scan support frame 116. A preferred linear bearing 122 is available from THK as part number SR30SB-2520. The scan unit 110 is supported by the linear bearing 122 for back and forth movement across the width of the steel strip 12 to end points several inches beyond the strip edges 200, 202.

As illustrated in FIG. 3, the scan support frame 116 defines a housing made of steel side walls 206 and end walls 208 that enclose the scan unit 110 inside an interior of the housing. The housing also encloses the servo motor 124. A separate housing encloses the servo power supply and servo amplifier (not shown). A preferred power supply and servo motor amplifier are the CPS-12-24 Power Supply and the MSA-12-80 Servo Amplifier, respectively, both available from Galil. The scan support frame 116 is fixed in relation to the strip path of travel by two upright supports 212 positioned on opposite sides of the strip 12, as illustrated in FIGS. 3 and 4.

The scan support frame 116 has two interior walls 214, 216 defined by rectangular-shaped steel forms that run the length of the scan support frame 116. An extruded and machined aluminum beam 220 is attached to one of the walls 214, and this beam 220 supports the linear bearing 122. The beam 220 has dimensions of approximately 9.84×1.81× 101.2 inches and minimizes undesirable deflection of the linear bearing 122.

The servo motor 124 is a reversible D.C. brush type servo motor mounted at one end of the scan support frame 116, as illustrated in FIGS. 2 and 4. A preferred servo motor 124 is the N23-54-1000 Round Cable Servo Motor available from Galil. A twenty-four volt D.C. signal for the servo motor 124 is developed by the same power supply (not shown) and the servo amplifier (not shown) discussed above. A motor shaft 222 extends beyond the interior wall 214 to a point beneath the linear bearing 122, as illustrated in FIG. 4. The shaft 222 supports a drive pulley 224 that drives a cogged timing belt 226 which engages the pulley 224. A preferred timing belt 226 is an XL Series Timing Belt. An idle pulley 227 on an opposite side of the scan support frame 116 is mounted for rotation as the motor shaft 222 moves the belt 226. The scan unit 110 is attached to the belt 226 by a toothed clamp bar 228 for back and forth movement with the belt 226.

As the belt 226 moves back and forth due to motor actuation, an encoder 230 mounted to the servo motor 124 monitors motor rotation with a resolution of 4,000 counts per turn. The encoder 230 is a phase quadrature encoder that produces a pair of timing signals conveying the position and the direction of rotation of the servo motor 124.

During setup of the first computer 130 a home position is found by moving the scan unit 110 to a limit switch 232, and the position of the scan unit 110 is determined in relation to this home position. As the servo motor 124 drives the scan unit 110 back and forth, the scan unit 110 generates data signals to update the position and shape of the steel strip 12. These data signals as well as power signals for operating the source 112 and photodetector 120 are coupled to the moving scan unit 110 by a multi-conductor retractile coiled cable 240 long enough to reach the scan unit 110 regardless of the position of the scan unit 110 along the linear bearing 122.

Control Program

Figure 5:
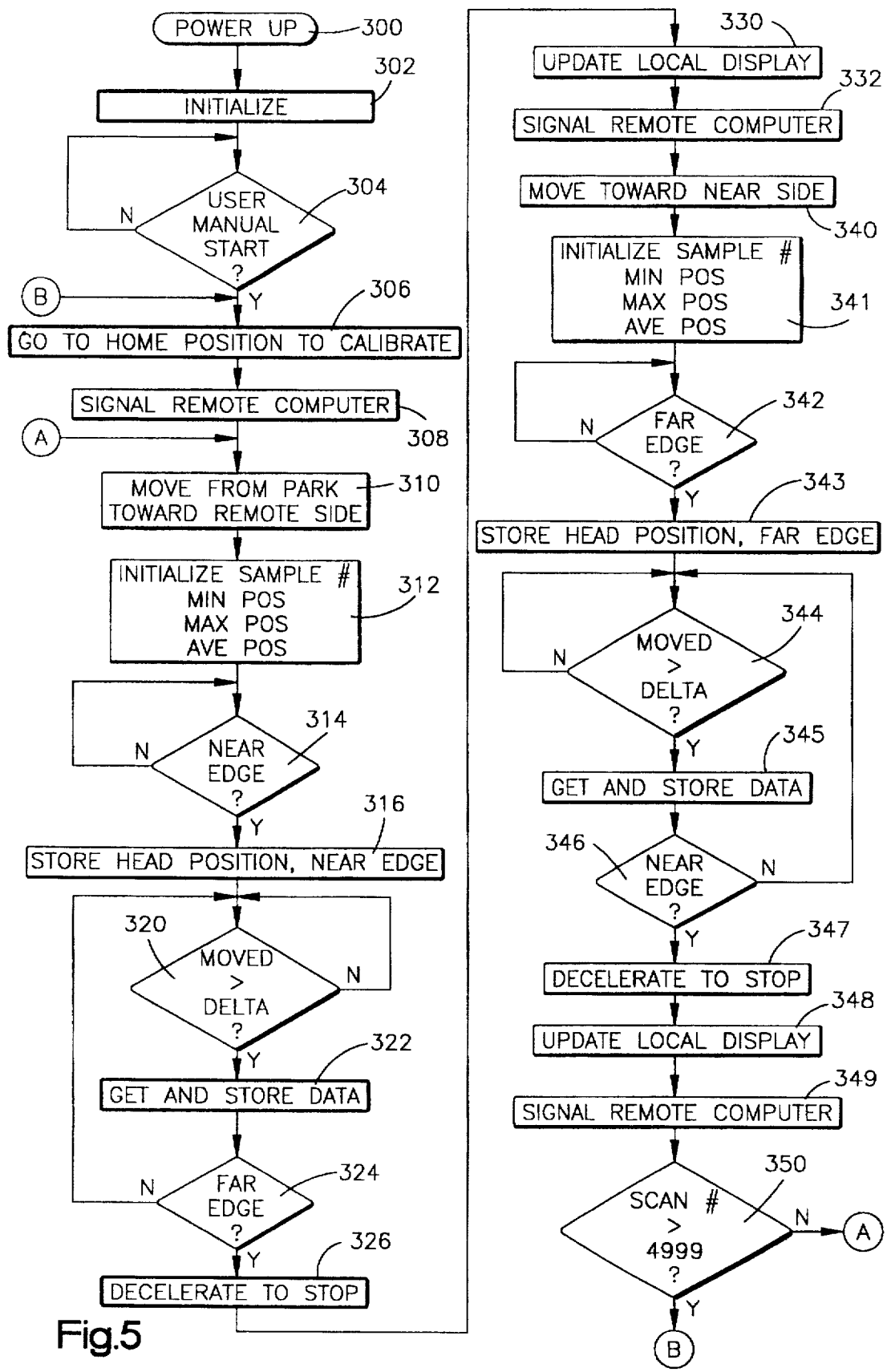
FIG. 5 illustrates a flow chart depicting the scanning process conducted by the scanning station under the direction and control of a programmable controller.

FIG. 5 illustrates a flow chart indicating the steps the first computer 130 performs to monitor the cross-sectional shape or profile of the steel strip 12. A preferred control program for both computers 130, 140 on the network is programmed in Microsoft QuickBasic. Because the second computer 140 acts as a slave to the first computer 130, the control program executing on the second computer 140 primarily updates the display 144 and periodically checks the first computer 130 to see if data is available.

For the first step 300 of the flow chart in FIG. 5, the computer 130 is powered up and performs self-tests. For step 302, the computer 130 initializes network communications and a laser interface board 244 (FIG. 2), and displays on the display 134 an initial prompt screen. The laser interface board 244 is coupled to the scan unit 110 by cable 240, as illustrated in FIG. 2. A preferred laser interface board 244 is a Computer Boards Inc. CIO-DAS16/jr having 16 Channel A/D @ 130 Khz, three counters, and eight DIO. For step 304, the computer 130 then waits for a keyboard input from the operator to start the scanning of the scan unit 110 back and forth across the strip 12. Once the operator signals the computer 130 to begin scanning, the computer 130 issues a command to turn on the laser source 112 of the scan unit 110.

The computer 130 then executes a routine for step 306 to initialize a servo motion controller 242 coupled to the servo motor 124, as illustrated in FIG. 2, and to cause the motion controller 242 to energize the servo motor 124 and move the scan unit 110 to a home position defined by the limit switch 232. The motion controller 242 informs the computer 130 when the limit switch position is reached, and the computer 130 responds by zeroing out a thirty-two bit position register of the motion controller 242. The thirty-two bit position register is used to indicate the position of the scan unit 110 relative to the strip 12. The computer 130 moves the scan unit 110 to a park position which is a predetermined position relative to the limit switch position and located between the position of the limit switch 232 and the near edge 200 of the strip 12. For step 308, the computer 130 clears a bit in memory to signal the remote computer 140 that no data is available and instructs the remote computer 140 to display a system online message.

A preferred motion controller 242 is an A5100 Single Axis Motion Controller available from Animatics. The motion controller 242 interfaces with the ISA bus of the computer 130, executes a series of commands initiated by the computer 130, and gathers data from the scan unit 110 for storage by the computer 130.

For step 310, the computer 130 instructs the motion controller 242 to move the scan unit 110 along the linear bearing 122 toward the far edge 202 of the strip 12. For step 312, the computer then initializes data variables for the sample number, minimum strip position, maximum strip position, and average strip position. The sample number is used to indicate the number of distance measurements taken for the current scan. The minimum strip position, maximum strip position, and average strip position are used to indicate the minimum distance, the maximum distance, and the average distance measured by the scan unit 110 in monitoring the strip 12 for the current scan. These variables are suitably updated as the strip 12 is monitored by the scan unit 110.

For step 314, the computer 130 monitors the return signal from the scan unit 110 for a valid reading. A valid reading will be obtained when the laser reaches the near edge 200 of the strip 12 at which time a digital-to-analog converter on the laser interface board 244 begins to capture laser data corresponding to the distance D from the laser to the strip 12. The computer 130 also captures motor orientation data from the thirty-two bit position register of the motion controller 242 and converts this position data into inches. The position of the near edge 200 and the corresponding distance data are stored together in a data array for step 316.

For step 320, the computer 130 waits until the scan unit 110 has moved at least 0.114 inches from the previous measurement monitored by the computer 130. Once the scan unit 110 is over the strip 12 and gathering data, the computer 130 continues to gather and store position and scan data for step 322 until the far edge 202 of the strip 12 is sensed for step 324. This occurs when the data from the scan unit 110 is no longer valid as a result of the scan unit 110 having been moved beyond the far edge 202 of the strip 12.

After the scan unit 110 has been moved beyond the far edge 202, the computer 130 instructs the motion controller 242 to decelerate the scan unit to a stop for step 326. The stored scan data is processed as the scan unit 110 decelerates to a stop. This processing includes a calculation of the average of all strip distances, a minimum and maximum strip distance, a peak height deviation based on the minimum and maximum strip distances, the width of the strip 12, and the height of the strip at edges 200, 202. This data as well as a graphical depiction of the shape of the strip 12 derived from the scan data is displayed on the local display 134 for step 330. The display data is also written to the computer's RAM virtual disk and a signal bit is set for step 332 to inform other computers on the network 142, such as the second computer 140, that data is ready for transfer on the network 142. The second computer 140 clears this bit after the second computer 140 has read the data to indicate the first computer 130 may overwrite this data for subsequent scans over the strip 12. A data processing cycle is completed when the scan unit 110 has decelerated to a stop.

For steps 340–349, a reverse scan is performed similarly as for steps 310–332. Briefly, the reverse scan begins by the computer 130 instructing the motion controller 242 to initiate movement toward the near edge 200 and continues by the computer 130 collecting position and distance data until the scan unit 110 moves beyond the near edge 200. The computer 130 then displays on display 134 the strip profile data for this reverse scan. Upon completion of the reverse scan, the computer 130 increments a scan number and determines for step 350 whether the scan number indicates the system should be recalibrated. If so, the computer 130 continues at step 306. Otherwise, the computer 130 continues at step 310.

An operator can shut down the scanning process by pressing a key on the keyboard of either computer 130 or 140. This shutdown initiation is periodically checked by each computer 130, 140. If an operator does shut down the scanning process, both computers 130, 140 display an appropriate message on their outputs. This is accomplished by the computer 130 or 140 setting an appropriate memory bit telling other computers to initiate a shutdown sequence. In shutting down the scanning process, the computer 130 moves the scan unit to the home position and turns off the scan unit 110 and the servo motor 124.

Strip Profile

Figure 6:
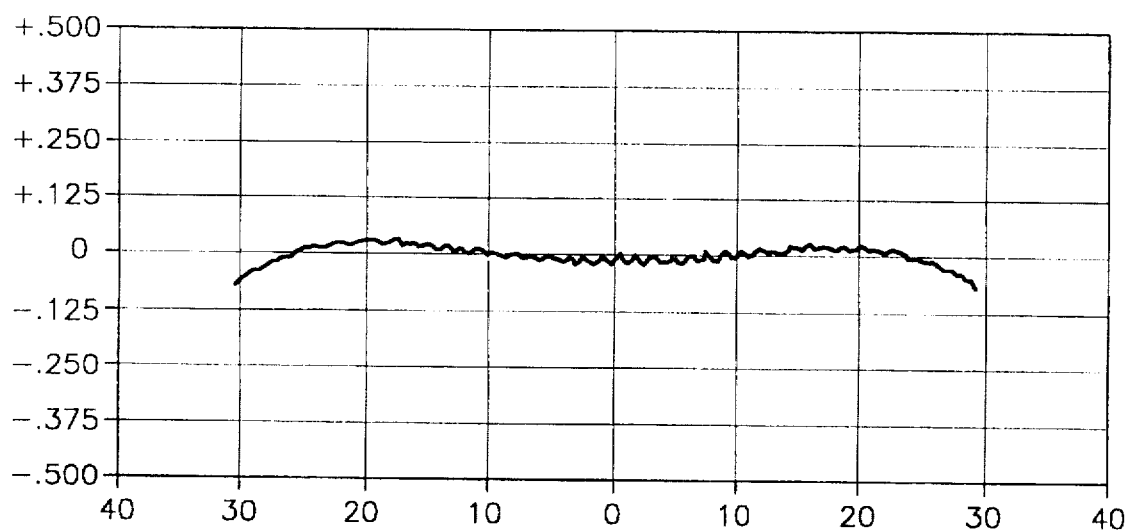
FIGS. 6 and 7 illustrate representative visual outputs from the programmable controller that allows an operator to monitor strip shape.
Figure 7:
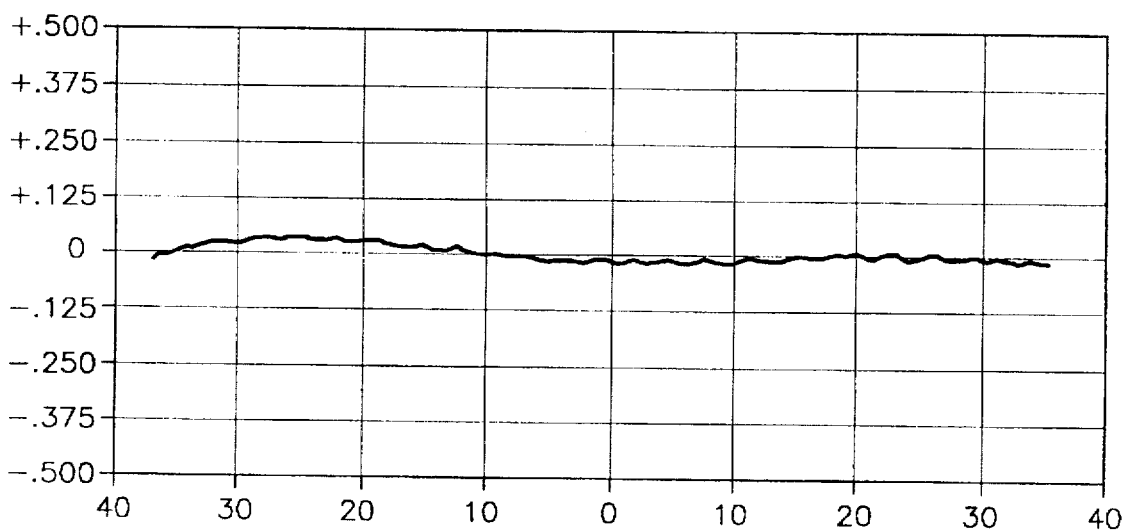

FIGS. 6 and 7 depict two representative profiles displayed on displays 134, 144. The profile illustrated in the display of FIG. 6 indicates corrective steps should be taken to provide a more uniformly shaped strip. The profile illustrated in the display of FIG. 7 corresponds to a relatively flat strip that may be suitably plated with a relatively uniform coating.

For steps 330 and 348 of FIG. 5, the computer 130 calculates the average strip distance which is used as a midpoint along the y-axis of the display. All displayed co-ordinates are relative to the average strip distance and are displayed in inches. Other dimensions and structures for displaying and/or logging scan data may be used. Furthermore, one or more computers may be connected to the data gathering computer via the network 142 and one or more other computers can be used to store a history of gathered data for later analysis.

Based on the periodic monitoring of the strip profile, an operator may manually adjust the leveler 34 to compensate for flatness deviations. The monitoring and control of the relative flatness of the strip shape in this manner helps to ensure the coating weight distribution over the steel strip is relatively more uniform, helping to minimize any scrapping of undercoated steel as well as any waste from overcoating steel.

For another embodiment, the leveler 34 may be automatically controlled by the computer 130 based on the strip profile data. A programmable logic controller may be coupled to the computer 130 and to the leveler 34, and the computer 130 may transmit digital control signals to the programmable logic controller to control the leveler 34. The programmable logic controller may generate suitable analog signals to adjust flattener roll positions of the leveler 34 in controlling strip flatness. A preferred interface to a programmable logic controller is a Computer Boards Inc. CIO-DAC02 having two channel D/A analog output. For still another embodiment, the computer 130 may transmit control signals to the plating section 50 to adjust the amount of coating plated over one or both sides of the strip 12. The computer 130 may generate these control signals based on the strip profile data to control the amount of coating plated over one or both sides of scanned portions of the strip 12.

The present invention has been described with a degree of particularity. It is appreciated, however, that the invention is to include all modifications and alterations in the disclosed design falling within the spirit or scope of the appended claims.

What is claimed is:

1. A monitoring apparatus comprising:
    (a) a drive system for moving a strip of material along a strip travel path;
    (b) a scan unit including a radiation source for directing a radiation beam toward a surface of the strip and a photodetector for monitoring radiation reflected back from the surface of the strip;
    (c) a linear bearing that supports the scan unit on one side of the strip for back and forth movement along a linear travel path that spans a width of the strip;
    (d) a motor coupled to the scan unit for moving the scan unit along the linear travel path on the one side of the strip such that the radiation source directs radiation toward the strip from the one side of the strip and such that the photodetector monitors return radiation on the one side of the strip;
    (e) a memory that stores profile data detected by the photodetector; and
    (f) a display that provides a visual indication of a profile of the strip based on the stored profile data.

2. The monitoring apparatus of claim 1, wherein the memory and the display form part of a data gathering computer having a computer interface coupled to the scan unit and the motor for controlling movement of the scan unit.

3. The monitoring apparatus of claim 2, wherein the computer interface comprises a motion controller for controlling energization of the motor and circuitry for gathering data from the photodetector, and
    wherein the data gathering computer stores the profile data in the memory with position data corresponding to a position of the scan unit relative to the strip.

4. The monitoring apparatus of claim 2, comprising a computer workstation coupled to the data gathering computer by a communications link for transferring data.

5. The monitoring apparatus of claim 1, comprising an encoder for providing signals related to a position of the scan unit as the motor moves the scan unit back and forth across the width of the strip.

6. The monitoring apparatus of claim 2, wherein the strip is a strip of steel, and
    wherein the data gathering computer includes an interface communicating with a steel forming apparatus to adjust a shape of the steel strip before the strip is monitored by the photodetector.

7. A method for monitoring the shape of a moving strip of material comprising the steps of:
    (a) causing the strip of material to move along a strip travel path;
    (b) moving both a radiation source and a detector back and forth across a width of the strip on one side of the strip to cause a radiation beam to strike a time varying portion of a surface of the strip and to be reflected back from the surface of the strip;
    (c) as the radiation beam sweeps across the surface of the strip from the one side of the strip, monitoring radiation reflected back from the surface of the strip and sensed by the detector on the one side of the strip to determine a shape of the surface of the strip; and
    (d) providing a visually perceptible shape profile of the surface of the strip.

8. The method of claim 7, comprising the step of adjusting the shape of the strip based on the determined shape of the surface of the strip.

9. The method of claim 7, comprising the step of displaying the visually perceptible shape profile of the surface of the strip at multiple locations by transmitting data to one or more workstations located along the strip travel path.

10. The method of claim 7, wherein the radiation source and detector move in a direction approximately perpendicular to the strip travel path.

11. An apparatus for monitoring a steel strip plating process comprising:
    (a) a drive system for moving a steel strip of material along a strip travel path;
    (b) structure defining a strip shaping station and a strip plating station;
    (c) a scan unit located between the strip shaping station and the strip plating station along the strip travel path and including a radiation source for directing a radiation beam toward a surface of the strip and a photodetector for monitoring radiation reflected back from the surface of the strip;
    (d) a linear bearing that supports the scan unit on one side of the strip for back and forth movement along a linear travel path that spans a width of the strip;
    (e) a motor coupled to the scan unit for moving the scan unit along the linear travel path on the one side of the strip such that the radiation source directs the radiation beam toward the strip from the one side of the strip and such that the photodetector monitors return radiation on the one side of the strip;
    (f) a data gathering computer that stores a plurality of data values in a computer memory corresponding to co-ordinate locations at which the radiation from the radiation source strikes the surface of the steel strip as indicated by radiation detected by the photodetector;
    (g) a computer display that provides a visual indication of the shape of the strip based on the stored data values; and
    (h) a computer interface coupled to the motor and the scan unit for directing back and forth scanning of the scan unit across the strip and gathering data from the scan unit corresponding to the shape of the steel strip.

12. The apparatus of claim 11, wherein the computer interface comprises structure for controlling operation of the strip shaping station.

13. The apparatus of claim 11, further comprising a plating monitoring station including another computer for monitoring strip shape, and
    wherein the apparatus further comprises networking structure for passing data back and forth between the data gathering computer and the other computer.

14. The apparatus of claim 13, wherein the data gathering computer comprises a communication interface for signalling the other computer that data corresponding to the shape of the strip has been gathered, and
    wherein the other computer periodically monitors data from the data gathering computer to determine if the data is available.

* * * * *